United States Patent [19]
Ratnakar

[11] Patent Number: 6,038,346
[45] Date of Patent: Mar. 14, 2000

[54] RUNS OF ADAPTIVE PIXEL PATTERNS (RAPP) FOR LOSSLESS IMAGE COMPRESSION

[75] Inventor: Viresh Ratnakar, Sunnyvale, Calif.

[73] Assignee: Seiko Espoo Corporation, Tokyo, Japan

[21] Appl. No.: 09/015,408

[22] Filed: Jan. 29, 1998

[51] Int. Cl.[7] .............................. G06K 9/36; H03M 7/34; H04N 1/417

[52] U.S. Cl. ........................... 382/239; 382/238; 341/51; 358/261.2

[58] Field of Search .................................. 382/239, 238, 382/240, 236, 232; 348/415, 409, 384, 420, 408; 341/51, 107, 106; 358/261.2, 430

[56] References Cited

U.S. PATENT DOCUMENTS

| | | | |
|---|---|---|---|
| 5,020,121 | 5/1991 | Rosenberg | 382/238 |
| 5,177,622 | 1/1993 | Yoshida et al. | 358/429 |
| 5,471,207 | 11/1995 | Zandi et al. | 382/232 |
| 5,491,564 | 2/1996 | Hongu | 382/238 |
| 5,497,434 | 3/1996 | Wilson | 382/232 |
| 5,615,287 | 3/1997 | Fu et al. | 382/232 |
| 5,659,631 | 8/1997 | Gormish et al. | 382/233 |
| 5,680,129 | 10/1997 | Weinberger et al. | 341/65 |
| 5,682,152 | 10/1997 | Wang et al. | 341/50 |
| 5,712,928 | 1/1998 | Murayama | 382/242 |
| 5,764,374 | 6/1998 | Seroussi et al. | 382/238 |
| 5,764,804 | 6/1998 | Yajima et al. | 382/238 |
| 5,901,251 | 5/1999 | Rust | 382/247 |

OTHER PUBLICATIONS

"Context–based Lossless Image Compression," Tischer et al., The Computer Journal, vol. 36, No. 1, 1993, pp. 68–77.
"Compression of Black–White Images with Arithmetic Coding," Langdon et al., IEEE Transactions on Communications, vol. COM–29, No. 6, Jun. 1981, pp. 858–867.
*DEFLATE Compressed Data Format Specification version 1.3*, Aladdin Enterprises, May 1996, P. Deutsch.
*Graphics Interchange Format Version 89a,*Compuserve Inc.
LOCO–I: A Low Complexity, Context–Based, Lossless Image Compression Algorithm, IEEE pp. 140–149. Marcelo J. Weinberger, et al.
*On Ordering Color Maps For Lossless Predictive Coding*, IEEE Transaction On Image Processing, vol. 5, No. 11, pp. 1522–1527, Nov. 1996, Nasir D. Memon.
*PNG (Portable Network Graphics)*Specification, W3C Recommendation, available at http://www.w3.org/TR/REC–png.
*Applications of Universal Context Modeling to Lossless Compression of Gray–Scale Images,*IEEE Transactions On Image Processing, vol. 5, No. 4, pp. 575–586, Apr. 1996, Marcelo J. Weinberger.
*Lossless Compression of Continuous–Tone Images via Context Selection, Quantization, and Modeling,*IEEE Transactions On Image Processing, vol. 6, No. 5, pp. 656–664, May 1997, Xiaolin Wu.
*LZW Data Compression,*Dr. Dobb's Journal, Oct., 1989, Mark Nelson.

Primary Examiner—Thomas D. Lee
Assistant Examiner—Wenpeng Chen
Attorney, Agent, or Firm—Michael T. Gabrik

[57] ABSTRACT

A new lossless compression technique is provided that is specifically designed for palettized synthetic images which typically consist of several sharply delineated uniform-color regions with overlaid text and symbols. The associated algorithm uses patterns of previously-coded neighboring pixels to predict and code each pixel. Preferably, the four immediate and previously-coded neighbors of the current pixel are used. That is, the pixel immediately to the left (or west), the pixel immediately above and diagonally to the left (or northwest), the pixel immediately above (or north), and the pixel immediately above and diagonally to the right (or northeast). The basic pattern determined by the neighboring pixels is augmented by incorporating the number of times the value of each of the neighboring pixels is repeated in the corresponding direction. The prediction rules for different patterns are learned and updated from the image itself during the coding and decoding processes.

30 Claims, 4 Drawing Sheets

RUNS OF ADAPTIVE PIXEL PATTERNS (RAPP) FOR LOSSLESS IMAGE COMPRESSION

BACKGROUND OF THE INVENTION

1. Field of the Invention

This invention relates generally to an image compression technique, and more particularly to an image compression technique that uses patterns of previously-coded neighboring pixels to predict and code each pixel. Still more particularly, the image compression technique of the present invention uses the neighboring pixel patterns to capture the number of distinct colors present in each of these pixels as well as the extent of these colors in corresponding directions.

2. Description of the Related Art

A typical high quality digitized color image may use 24 bits per pixel (bpp)—8 bits for each of the three basic color components: red (R), green (G) and blue (B) in RGB color space or for each of the three basic luminance-chrominance components: luminance (Y), chrominance ($C_B$) and chrominance ($C_R$) in $YC_BC_R$ color space. To transmit or store such images in the uncompressed state (i.e., in the spatial or pixel domain) is simply too costly in terms of time and memory requirements. Thus, applications and devices which store or transmit high quality digitized color images typically do so in a compressed format, using one of the currently available compression techniques.

Various image compression techniques have been proposed to reduce the amount of data used to represent a digitized color image while, at the same time, providing quality image representation. How much the image is compressed, given in terms of a compression ratio, depends on the image itself, the technique used and the amount of information loss that can be tolerated. Some of these techniques are "lossless," meaning that they preserve all information of the original image so that it is reproduced exactly when the data is decompressed. Other techniques, commonly referred to as "lossy," discard information which is visually insignificant. By only approximating the original image (rather than reproducing it, exactly), lossy techniques are generally able to produce higher compression ratios than lossless techniques. In selecting the appropriate compression technique and compression ratio, the user must consider the particular image to be compressed, the desired image quality as well as transmission time and memory requirements, with the understanding that higher compression ratios lead to lower transmission times and memory requirements but also produce lower quality images.

Of the lossless image compression techniques presently available, some employ predictive coding models. In general, these techniques were designed for continuous-tone, "natural" images, and not for palettized, "synthetic" images, such as computer-generated graphics, street maps, clip-art and the like, which have several sharply delineated uniform-color regions with overlaid text and symbols. A palettized color image consists of a color look-up table, with the value of each pixel stored as an index into the table. When used on palettized images, these predictive compression techniques, which include CALIC and JPEG-LS among others, operate to compress each of the R, G and B planes of the image separately, after expanding each palette index into its actual color values. For each of the three color planes, the pixels are scanned and coded in raster-order. During this process, the values of neighboring pixels that have already been scanned and coded are used to determine a context and to predict the current pixel using a context-dependent formula. The error between the actual value of the current pixel and its predicted value is then coded by a context-dependent entropy encoder.

One of the problems associated with these predictive techniques is the inherent inefficiency which results from compressing each of the three color planes separately. Another problem is that these predictive techniques generally do not work well on palettized images directly, because, if palette indices are used, prediction formulas tend to become meaningless since palette indices for neighboring pixels may have no correlation at all. In fact, palettized images can typically be compressed more using non-predictive techniques, such as GIF and PNG (without the "filtering" mode), compared to predictive techniques, such as JPEG-LS, PNG (with "filtering" on) and UCM. There has been some work done on reordering the palette to make the predictive coding techniques more effective on palettized images. With such reordering, the predictive techniques achieve significantly better compression on most images. However, for street-map images, the inventor herein has found that only very sophisticated CALIC and UCM algorithms could achieve better compression than the non-predictive PNG algorithm, and that too only after reordering the palette.

Some specific patents directed to data compression techniques that use previously-coded neighboring pixels to predict the current pixel are discussed below. For example, U.S. Pat. No. 5,020,121 proposes a method for compression of language characters or two level images on a computer screen. A character or symbol is represented on a block of pixels which is decomposed into a plurality of nonoverlapping sub-blocks. The known pixel configuration of neighborhood pixels is used to predict the most probable pixel configuration for the target sub-block based on statistical analysis of the sub-block pixel configurations for all characters in the set. U.S. Pat. No. 5,682,152 incorporates lossless entropy encoding into a lossy compression system. Image data is decorrelated into a baseband and multiple subbands. Pixels in those bands are then coded using neighboring pixels. U.S. Pat. No. 5,680,129 proposes a lossless image compression technique which uses a context quantizer that determines a context for the current pixel to be coded from previously-coded neighboring pixels.

U.S. Pat. No. 5,471,207 provides for the compression of palettized images using an entropy encoder. Input symbols in an M-ary alphabet are binarized based on a context model of the input data. Binarization is determined from a reindexing table which maps each input symbol to a number of binary values. The mapping of the reindexing table is determined from the images to be compressed and is transmitted with the compressed images as overhead.

Other patents directed to various techniques for compression of image data include U.S. Pat. No. 5,497,434 wherein a compressor searches for matching pixel strings in previous and current frames. If a match is found, the compressor outputs the most appropriate pixel code. Otherwise, the unmatched pixel count is incremented. The technique employed in U.S. Pat. No. 5,615,287 involves the compression of an image by subtracting a filled edge array from an image array to generate a difference array. In U.S. Pat. No. 5,659,631 image compression is achieved by coding color planes of the image. The color planes are ordered by density and the densest plane is coded first. Other color planes are then coded but pixels known to have colors from previously coded planes are not coded. The last color plane is not coded but is deduced from all of the other color planes.

However, none of these patents provide a compression technique wherein the neighboring pixel patterns are used to predict and code a current pixel by capturing the number of distinct colors present in the neighboring pixels as well as the extent of these colors in the corresponding directions of each of the pixels.

OBJECTS OF THE INVENTION

Therefore, it is an object of the present invention to overcome the aforementioned problems. Another object of this invention is to provide a more efficient compression technique for lossless compression of palettized synthetic images which have uniform-color regions, sharp boundaries, and overlaid text and symbols. Still another object of this invention is to provide a lossless image compression technique which works in the palette index plane itself and which compresses an image by using patterns, instead of values, of previously-coded neighboring pixels to predict and code each pixel.

SUMMARY OF THE INVENTION

According to one aspect of the invention, a coding process is provided for coding pixels in a digitized image to losslessly compress the image. The process involves scanning the pixels in raster-order and determining an augmented pattern of the current pixel based on previously-coded neighboring pixels that are available. For pixels not in the first row, first column or last column, there are four (4) previously-coded neighboring pixels respectively located to the west, northwest, north and northeast of the current pixel. The augmented pattern comprises a basic pattern, which gives a label to each previously-coded neighboring pixel, and a character (such as a number) for each previously-coded neighboring pixel that is the number of times the value of that particular previously-coded neighboring pixel is repeated in its corresponding direction. The labels in the basic pattern identify which of the previously-coded neighboring pixels are identical.

In accordance with the invention, for each augmented pattern, a probability for each label of the underlying basic pattern is determined based on the number of times that label would have been a successful predictor for that augmented pattern, at any point in the coding process. A label of the current pixel is then predicted based on a comparison of the determined probability for each label. The actual label of the current pixel is determined and, if the prediction was successful, a special symbol indicating SUCCESS is produced.

If, on the other hand, the prediction was not successful, then a determination is made as to whether the actual value of the current pixel is the same as the value of any of the previously-coded neighboring pixels and, if so, which one. If this determination is successful, then a special symbol is produced, indicating which of the previously-coded neighboring pixels has the same value.

If the above determination too fails, then a special symbol indicating prediction failure is produced, and the actual value of the pixel is appended to a list of such anomalies.

Finally, the list of produced symbols and the list of anomalous pixels are entropy-coded to obtain the compressed image.

Once compressed, the coded image data may be stored or transmitted. Later, during decompression, the coding process is undone by a decoding process which performs steps that complement the coding steps.

The coding and decoding process of the present invention may be implemented by a processor executing appropriate software, discrete components application specific integrated circuits or combination thereof. For example, the coding and decoding processes may be carried out by a suitable encoder and decoder respectively.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The lossless image compression technique of the present invention, RAPP (Runs of Adaptive Pixel Patterns), which is particularly suited for palettized synthetic images, uses patterns of previously-coded neighboring pixels (instead of their values) to predict and code each pixel based on a set of rules which are adaptively learned from the image coding process itself. Compare the standard runlenght encoding (RLE) technique, where each pixel is predicted to be the same as its neighbor to the left. (A run of pixels can be thought of as a sequence of successful predictions.) In RLE, the prediction will fail on every pixel that lies on an edge of a uniform color region not oriented horizontally. Fewer prediction failures (i.e., longer runs) will result in better compression. To this end, RAPP coding uses a rich set of patterns of previously-coded neighboring pixels in order to predict even the edge pixels with a high rate of success.

As used in RAPP, a pixel pattern attempts to capture edges and uniform regions and their orientations so that the current pixel can be predicted successfully. For each pattern of neighboring pixels, a prediction rule is used to predict the current pixel. These rules are initially preset, but the coding algorithm is designed to enable the encoder and decoder to adaptively learn the rules based on prior occurrences of the pattern. That is, the prediction rules are learned and updated in response to the image patterns being found during the coding/decoding process itself. The set of pixel patterns, the rule-learning process, and the encoder and the decoder will now be described in detail.

Pixel Patterns

Figure 1:
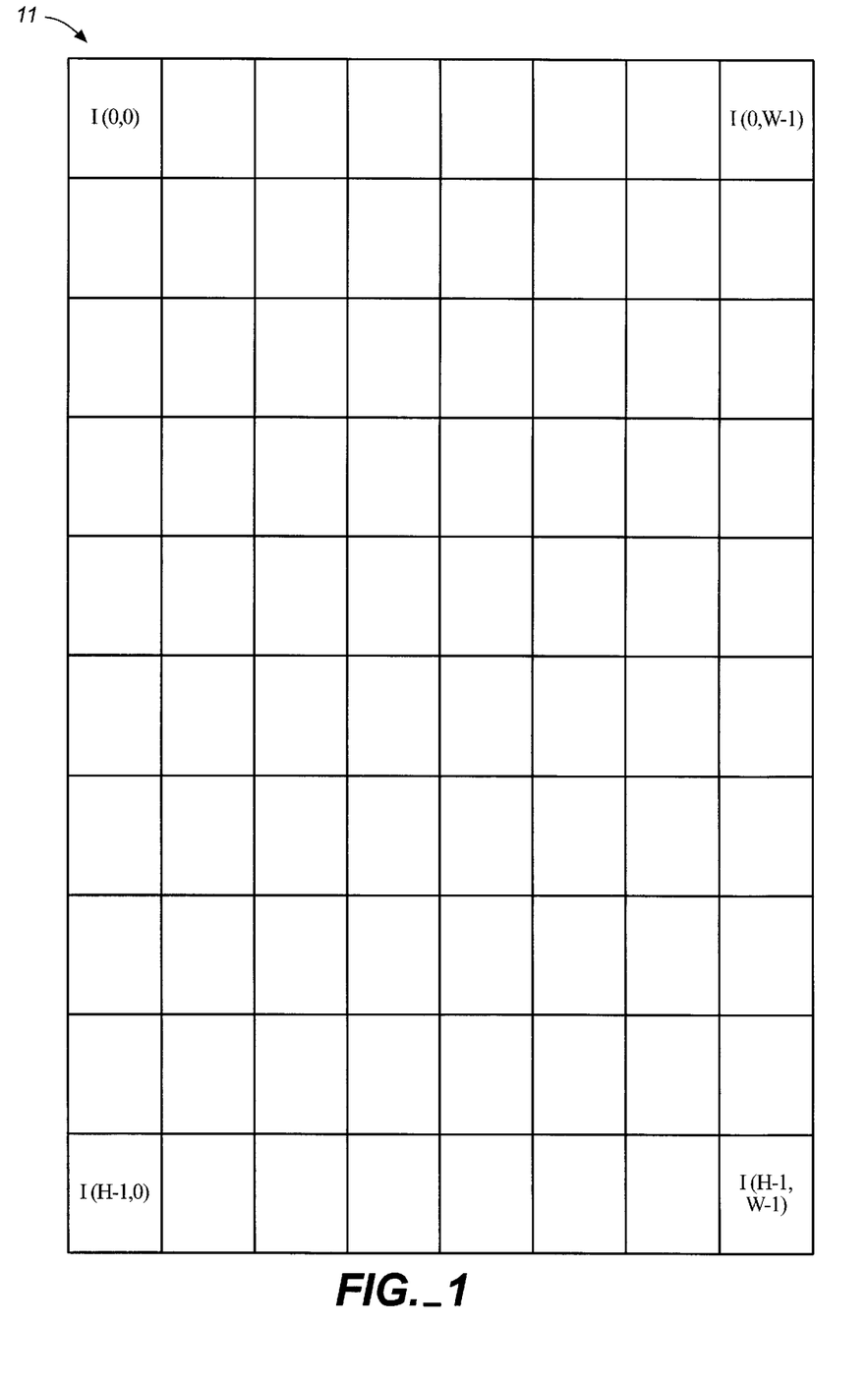
FIG. 1 is a schematic representation of the palettized pixels of a W×H image I in accordance with the present invention.
Figure 2:
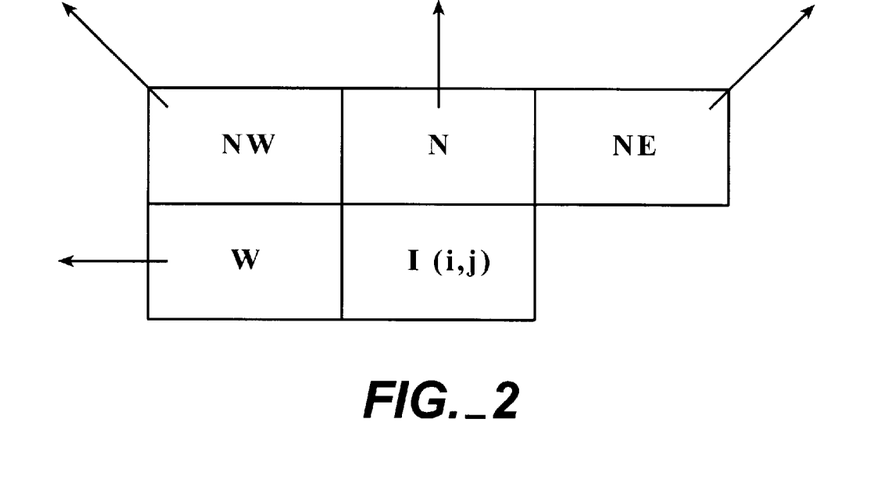
FIG. 2 is a schematic representation of pixel I(i, j), its four immediate and previously-coded neighboring pixels and each of their corresponding directions.

Referring first to FIG. 1, each of the palettized pixels of a W×H image 1, designated generally by reference numeral 11, not in the first row, first column or last column, is represented by I(i, j), for 0≦i<H and 0≦j<W. Thus, the corner pixels beginning at the upper left and moving clockwise are: I(0, 0), I(0, W−1), I(H−1, W−1) and I(H−1, 0), as shown in FIG. 1. Encoding and decoding proceed in raster-order (left to right and top to bottom). For each pixel to be coded, the pattern of its already-coded neighboring pixels is determined. With reference to FIG. 2, consider a pixel, I(i, j), not in the first row, first column, or last column (these special cases are also handled similarly, but with a smaller number of neighbors and patterns). As shown in FIG. 2, the technique focuses on the four immediate and previously-coded neighbors of this pixel. With respect to the current pixel, I(i, j), the pixel immediately to the left (or west) is indicated by W, the pixel immediately above and diagonally to the left (or northwest) by NW, the pixel immediately above (or north) by N, and the pixel immediately above and diagonally to the right (or northeast) by NE.

The set of basic patterns consists of the 15 possible ways of labeling these pixels with at most four labels. Denoting the labels by the letters A, B. C and D, the fifteen basic patterns are listed below in Table 1. Each basic pattern is designated by a string of four letters, the letters identifying the labels of the W, NW, N, and NE neighbors, respectively.

TABLE 1

The fifteen basic neighborhood patterns for the 4-neighbors case

| Basic patterns | # Distinct labels |
|---|---|
| AAAA | 1 |
| AAAB, AABA, ABAA, ABBB | 2 |
| AABB, ABAB, ABBA | 2 |
| AABC, ABAC, ABCA, ABBC, ABCB, ABCC | 3 |
| ABCD | 4 |

The letters A, B, C and D identify which pixels in the neighborhood have identical values. For example, the color pattern labeled AABC represents the case where the W-neighbor and NW-neighbor are identical, while the N-neighbor and NE-neighbor are distinct from them as well as from each other.

Let $h=(x_W, x_{NW}, x_N, x_{NE})$ denote a neighborhood of pixel values. Let $\rho(h)$ denote the basic pattern determined by the pixel values $x_W, x_{NW}, x_N,$ and $x_{NE}$. For a given pixel value x, let the "labeling function" $\rho(x, h)$ be defined as follows:

if x is different from each of $(x_W, x_{NW}, x_N, x_{NE})$ then $\rho(x, h)$ is 0;

if x is the same as some $x_d$ from $(x_W, x_{NW}, x_N, x_{NE})$ then $\rho(x, h)$ is the label (A, B, C or D) denoting $x_d$ in the basic pattern $\rho(h)$. Let $\theta^{-1}(u, h)$ be that value of x such that $\theta(x, h)=u$, for u ∈ {A,B,C,D}. Note that $\theta^{-1}$ may not be well defined for some combinations of (u, h).

For example, if $x_W=x_{NW}=128$, and $x_N=64$ and $x_{NE}=255$, then h=(128, 128, 64, 255)

$\rho(h)$=AABC $\theta(128, h)=A$, $\theta^{-1}(A, h)=128$ $\theta(64, h)=B$, $\theta^{-1}(B, h)=64$ $\theta(255, h)=C$, $\theta^{-1}(C, h)=255$ $\theta(x, h)=0$ for x ∉ {128, 64, 255}

The set of basic patterns are now extended by incorporating the number of times the value of each of the neighboring pixels (W, NW, N, NE) is repeated in the corresponding direction, each direction being indicated in FIG. 2 by an arrow associated with the corresponding neighboring pixel. This number is clamped at some limit, denoted by M, which is a parameter in the coding model. Thus, along each of the four directions, the run can be any integer in the range [1, M].

Let the tuple $r=(r_W, r_{NW}, r_N, r_{NE})$ denote the neighboring runs. The augmented neighborhood pattern, $\rho_r$, for the current pixel, is of the form: $\rho_r=(\rho(h), r)$, meaning that each augmented pattern includes one of the 15 basic patterns plus a tuple indicating the number of identically valued pixels along each direction. Thus, the total number of patterns is 15 $M^4$. The greater the value of M, the bigger the pattern set. RAPP works by statistically learning prediction rules for each pattern during the coding/decoding process itself As such, the pattern set must be large enough to discriminate between patterns with different statistics, but not so large as to unduly increase the complexity of the coding/decoding process. Moreover, if the value is too large, the number of occurrences of patterns is likely to decrease. This would lead to coding inefficiency, as for each pattern there is an initial cost (i.e., incorrect predictions) incurred until its rule stabilizes. It has been found that the value M=4 is a good practical choice.

As an example, consider the following image data:

| 12 | 12 | 12 | 23 | 12 | 12 |
|---|---|---|---|---|---|
| 12 | 12 | 12 | 23 | 23 | 12 |
| 12 | 12 | 12 | 23 | 23 | 23 |

If M=2, then the pattern for the underlined pixel in row 2, column 4 is (AnABA, (3, 1, 1, 1)) where A represents 12 and B represents 23.

As previously noted, pixels which do not have four already-coded neighboring pixels are treated similarly. For pixels in the first row (except the first pixel), only the W-neighbor is available. In that case, the neighborhood pixels are represented as $h=(x_W)$, and the neighboring runs as $r=(r_W)$. Thus, the basic pattern, $\rho(h)$, is always the single letter string A, and the prediction rule simply predicts A irrespective of $r=(r_W)$, but to simplify the matter, the augmented pattern, $(\rho(h), r)$, may be used even for the first row.

For pixels in the first column (except in the first row), the N-neighbor and the NE-neighbor are known. The neighborhood pixels are represented as $h=(x_N, x_{NE})$, and the neighboring runs as $r=(r_N, r_{NE})$. The basic pattern, $\rho(h)$, can be any value from the set {AA, AB}.

Finally, for pixels in the last column, (except in the first row), the W, NW, and N neighbors are available. The neighborhood pixels are represented as $h=(x_W, x_{NW}, x_N)$, and the neighboring runs as $r=(r_W, r_{NW}, r_N)$. The basic pattern, $\rho(h)$, can be any value from the set {AAA, AAB, ABA, ABB, ABC}.

Adaptive Prediction Rules

Each augmented pattern has up to four probabilities (one for each label in the basic pattern) associated with it, which determine the prediction. These probabilities are updated after each prediction to incorporate the actual value of the pixel. For example, suppose the neighborhood pattern of the current pixel is (AABC, (1, 1, 1, 1)). This pattern has associated with it three probabilities: $p_A, p_B, p_C$. If $p_A$ is the greatest of these three, the current pixel is predicted to be the same as its W-neighbor (which is the same as the NW-neighbor). If $p_B$ is the greatest, then the prediction value is that of the N-neighbor, while if $p_C$ is the greatest, the NE-neighbor is used. Ties are broken in the order W, NW, N, and NE. In the labeling scheme of this invention, the labels in any pattern are also lexicographically ordered in the order W, NW, N, and NE. Hence, ties can be broken by choosing the lexicographically lesser label. The probabilities are stored simply as the integer counts of the numbers of times the corresponding predictor would have been successful. The prediction (A, B, C or D) resulting from probabilities $p_A$, $p_B$, $p_C$ and $p_D$ may be denoted by $\pi(p_A, p_B, p_C, p_D)$. From the above discussion, $\pi(p_A, p_B, p_C, p_D)$ is seen to be the lexicographically lowest label, d, which has the greatest prediction probability, pd.

Encoder and Decoder

The coding and decoding process as well as the coding algorithm will now described with reference to the block diagram in FIG. 3, the flow diagram in FIG. 4, and detailed descriptions in pseudo-code. It should be noted that the block and flow diagrams illustrate the performance of certain specified functions and relationships thereof. The boundaries of these functional blocks have been arbitrarily defined herein for the convenience of description. Alternate boundaries may be defined so long as the specified functions and relationships thereof are appropriately formed. Moreover, the flow diagram and pseudo-code do not depict syntax or any particular programming language. Rather, they illustrate the functional information one skilled in the art would require to fabricate circuits or to generate computer software to perform the processing required. Each of the functions depicted in the block and flow diagrams may be implemented, for example, by computer software instructions, a functionally equivalent circuit such as a digital signal processor circuit, an application specific integrated circuit (ASIC) or combination thereof.

Figure 3:
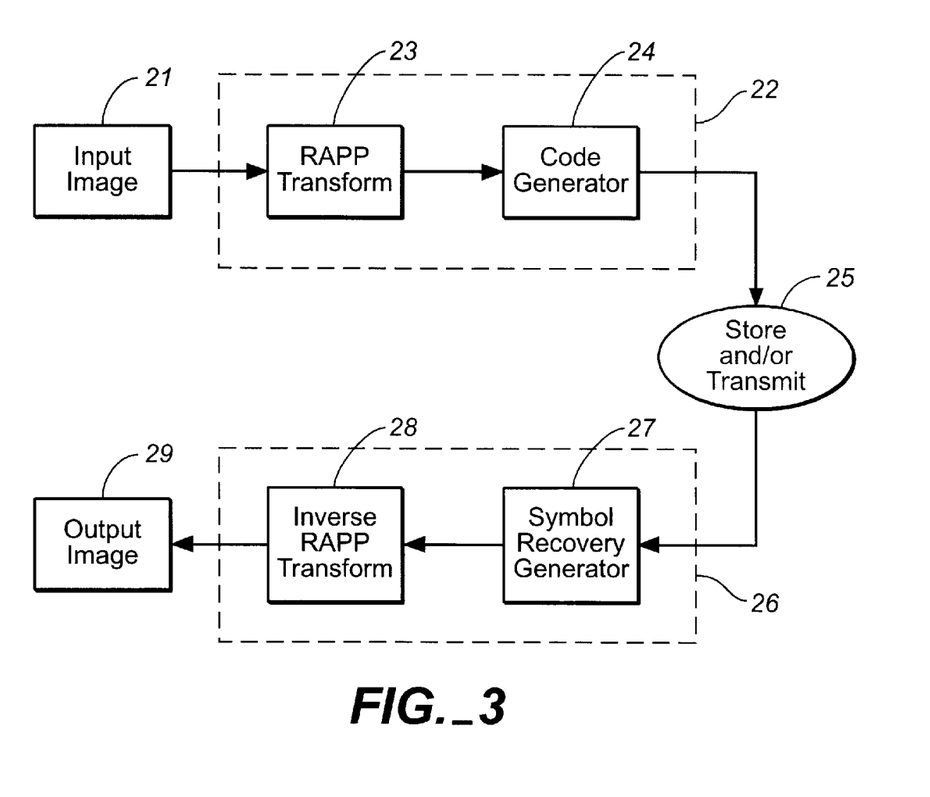
FIG. 3 is a block diagram illustrating the coding and decoding process of the present invention.

The coding and decoding process is generally illustrated in FIG. 3. An uncompressed input image 21 consisting of pixel data is operated on by an encoder 22. The encoder 22 applies the RAPP-Transform (to be described) to the pixel data in block 23 and then entropy-encodes the outputs of the RAPP-Transform in block 24. Block 25 represents the storage and/or transmission of the compressed image data. For example, the compressed image data may be stored on, or transmitted to, a computer, a computer readable removable storage media device such as a diskette or CD ROM, a printer or other device capable of storing or transmitting such information. To decompress the compressed image data, a decoder 26 entropydecodes the coded outputs of the RAPP-Tranform in block 27 and then applies the RAPP-Inverse Transform (to be described) in block 28 to generate the uncompressed output image in block 29.

The algorithm for RAPP-Transform proceeds as follows. The pixels are scanned in raster-order. For each pixel, the current augmented pattern (consisting of a basic pattern and a tuple of runs) is determined, and the corresponding prediction probabilities are used to predict its value. If the prediction is correct then the symbol SUCCESS is appended to an output list called TrendList. If the prediction is incorrect, then a special symbol is appended to TrendList, to identify one of several possible cases. This symbol, denoted by X, can have several possible values, depending on the basic pattern. These values are described in Table 2.

TABLE 2

The special symbol following a failed prediction

| Basic pattern | Possible values of X |
| --- | --- |
| A | ANOMALY-0 |
| AA | ANOMALY-0 |
| AB | OTHER-1-1, ANOMALY-1 |

TABLE 2-continued

The special symbol following a failed prediction

| Basic pattern | Possible values of X |
| --- | --- |
| AAA | ANOMALY-0 |
| AAB, ABA, ABB | OTHER-1-1, ANOMALY-1 |
| ABC | OTHER-2-1, OTHER-2-2, ANOMALY-2 |
| AAAA | ANOMALY-0 |
| AAAB, AABA, ABAA, ABBB, AABB, ABAB, ABBA | OTHER-1-1, ANOMALY-1 |
| AABC, ABAC, ABCA, ABBC, ABCB, ABCC | OTHER-2-1, OTHER-2-2, ANOMALY-2 |
| ABCD | OTHER-3-1, OTHER-3-2, OTHER-3-3, ANOMALY-3 |

The symbol OTHER-n-m is used to indicate the case when the basic pattern has n+1 distinct labels, and the current pixel is the same as one of its neighbors (other than the one that was predicted). The value m identifies which of the other n neighbors would have been the correct predictor. For example, suppose the basic pattern is ABAC, and the prediction rule predicts A. If the current pixel is equal to its NW-neighbor (labeled B in ABAC), then the special symbol X takes the value OTHER-2-1. If the prediction is B but the current pixel is equal to its NE-neighbor, then X takes the value OTHER-2-2.

When the current pixel is predicted incorrectly, and it is also not the same as any of its four neighbors, the symbol ANOMALY-n is appended to TrendList, where n is 0, 1, 2 or 3, (n+1 is the number of distinct labels in the basic pattern). In this case, the actual value of the anomalous pixel is appended to a list, called AnomalyList.

Figure 4:
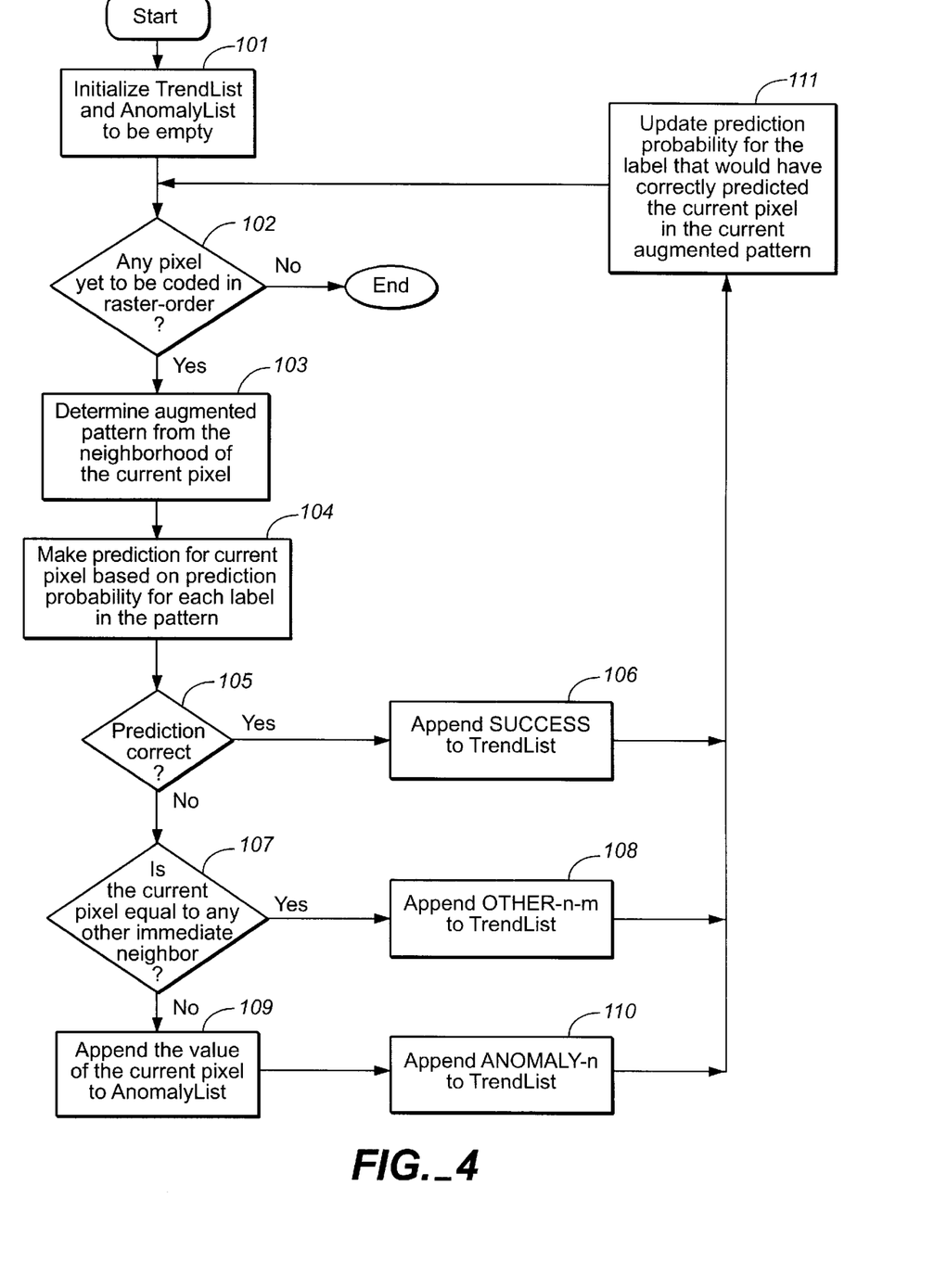
FIG. 4 is a flow diagram which illustrates the core algorithm of the RAPP lossless image compression technique in accordance with the invention.

The algorithm for RAPP-Transform is illustrated in FIG. 4. Referring to FIG. 4, the coding algorithm begins and proceeds to step 101 where the two lists produced by RAPP-Transform, TrendList and AnomalyList, are initialized to be empty. If it is determined in step 102 that there is another pixel in the rasterordering of pixels yet to be coded, the augmented pattern (along with its associated prediction probabilites) for this current pixel is determined in step 103. In step 104, the current pixel is predicted to be identical to the neighboring pixel whose label has the lexicographiclly lowest label among the labels with the greatest prediction probability in the augmented pattern determined in step 103. Whether or not that prediction is correct is determined in step 105. If it is, then the symbol SUCCESS is appended to TrendList in step 106, and the algorithm proceeds to step 111. If not, then in step 107, it is checked if the current pixel is identical to any of the neighbors other than the one predicted in step 104. If it is, then the special symbol OTHER-n-m is appended to TrendList in step 108, and the algorithm proceeds to step 111. The special symbol OTHER-n-m uniquely identifies (by means of n and m values, as explained above) which of the other neighbors is equal to the current pixel. If the test in step 107 fails, then the algorithm appends the value of the current pixel to AnomalyList in step 109. It then appends the symbol ANOMALY-n to TrendList in step 110, and proceeds to step 111. After processing the current pixel along any of these paths, the algorithm updates the prediction probabilities for the current augmented pattern based on the actual value of the current pixel, in step 111, and then returns to step 102 to proceed with the next pixel in raster-order.

This decomposition of the image into the components TrendList, and AnomalyList can be seen as a transformation which exposes the inherent structure of the image to make it more amenable to compression. The two components, TrendList and AnomalyList, are then entropy coded.

To further illustrate the coding process and the functional information required to implement the invention, the algorithm is further described conceptually in pseudo-code. In this pseudo-code, the arrays N-nbr[W], N-run[W], NW-nbr [W+H+1], NW-run[W+H+1], NE-nbr[W+H+1], and NE-run[W+H+1] keep track of the neighbors and runs in the corresponding directions. If i denotes the row number and j the column number, then the N-arrays are indexed by j, the NW-arrays by j−i, and the NE-arrays by j+i. A pair of variables, W-nbr and W-run, is enough to keep track of the W-neighbors. Runs are updated using the auxiliary procedure Run-Update, given below.

```
procedure: Run-Update
  inputs: nbr, run, pixel
  outputs: nbr, run
begin
if nbr == pixel
  run++
  if run > M
    run = M
else
  nbr = pixel, run = 1
end
procedure: RAPP-Transform
  input: Image I with width W, height H
  outputs: TrendList, AnomalyList
begin
/* initialize prediction-probability arrays and output lists */
for each augmented pattern ρ_r
  Pρ_r[A] = Pρ_r[B] = Pρ_r[C] Pρ_r[D] = 0
TrendList={}, AnomalyList={}
/* initialize neiglibors to −1 (invalid) and runs to 0 */
for j=0 to W − 1
  N-nbr [j]=−1, N-run [j]=0
for i=0 to H − 1
  for j=0 to W − 1
    NW-nbr [j−i]=−1, NW-run [j−i]=0
    NE-nbr [j+i]=−1, NE-run [j+i]=0
for i=0 to H − 1
  for j=0 to W − 1
    if i==0 and j ==0
      /* the first pixel is always an anomaly */
      append I(0,0) to AnomalyList
      W-nbr=N-nbr [0]=NW-nbr [0−0]=NE-nbr [0+0]=I(0,0)
      W-run=N-run [0]=NW-run [0−0]=NE-run [0+0]=1
      continue
    if i==0
      /* first row */
      h=(W-nbr), r=(W-run)
    else if j==0
      /* first column */
      h=(N-nbr [0], NE-nbr [0+i] ), r=(N-run [0], NE-run [0+i])
    else if j==W − 1
      /* last column */
      h=(W-nbr, NW-nbr [j−i], N-nbr [j])
      r=(W-run, NW-run [j−i], N-run [j])
    else
      /* pixels with four neighbors */
      h=(W-nbr, NW-nbr [j−i], N-nbr [j], NE-nbr [j+i])
      r=(W-run, NW-run [j−i], N-run [j], NE-run [j+i])
    ρ=ρ(h) /* the basic pattern */
    ρ_r=(ρ, r) /* the augmented pattern */
    u=π(Pρ_r[A], Pρ_r[B], Pρ_r[C], Pρ_r[D])
    /* u ∈{A,B,C,D} is the predicted label */
    x=θ^−1(u, h)/* x is the predicted pixel value */
    if x==I(i, j)
      append SUCCESS to TrendList
    else
      append the appropriate symbol, X, from Table 2 to TrendList
      if X is an ANOMALY-n symbol
        append I(i, j) to AnomalyList
    /* update prediction probabilities for ρ_r */
    u'=θ (I(i, j), h)
```

```
    if u' ≠ 0
      Pρ_r[u']++
    /* update neighborhoods and runs */
    if j==W − 1
      W-nbr=−1, W-run=0 /* reset W-neighbor */
    else
      Run-Update(W-nbr, W-run, I(i, j))
    Run-Update(NW-nbr [j−i], NW-run [j−i], I(i, j))
    Run-Update(N-nbr [j], N-run [j], I(i, j))
    Run-Update(NE-nbr [j+i], NE-run [j+i], I(i, j))
end
```

Conceptually, the encoder applies the RAPP-Transform to the palettized input image, and then entropy-codes the lists TrendList and AnomalyList. An entropy coding technique is outlined in the "Implementation" section. The decoder decodes the entropy-codes to recover the lists TrendList and AnomalyList, and then applies the RAPP-InverseTransform, which is very similar to the RAPP-Transform, but is described here for completeness. The pseudo-code uses a procedure called "Behead," which simply extracts the first element of a list.

```
procedure: RAPP-InverseTransform
  inputs: TrendList, AnomalyList, W, H
  outputs: Image I
begin
/* initialize prediction-probability arrays */
for each augmented pattern ρ_r
  Pρ_r[A]=Pρ_r[B]=Pρ_r[C]=Pρ_r[D]=0
/* initialize neighbors to − 1 (invalid) and runs to 0 */
for j=0 to W − 1
  N-nbr [j]=− 1, N-run [j]=0
for i=0 to H − 1
  for j=0 to W − 1
    NW-nbr [j−i] =−1, NW-run [j−i]=0
    NE-nbr [j+i]=−1, NE-run [j+i]=0
for i=0 to H − 1
  for j=0 to W − 1
    if i==0 and j==0
      /* the first pixel is always an anomaly */
      I(0, 0)=Behead(AnomalyList)
      W-nbr=N-nbr [0]=NW-nbr [0−0]=NE-nbr [0+0]=I(0, 0)
      W-run=N-run [0]=Nw-run [0−0]=NE-run [0+0]=1
      continue
    if i==0
      /* first row */
      h=(W-nbr), r=(W-run)
    else if j==0
      /* first column */
      h=(N-nbr [0], NE-nbr [0+i]), r=(N-run [0], NE-run [0+i])
    else if j==W = 1
      /* last column */
      h=(W-nbr, NW-nbr [j−i], N-nbr [j])
      r=(W-run, Nw-run [j−i], N-run [j])
    else
      /* pixels with four neighbors */
      h=(W-nbr, NW-nbr [j−i], N-nbr [j], NE-nbr [j+i])
      r=(W-run, Nw-run [j−i], N-run [j], NE-run [j+i])
    ρ=ρ(h) /* the basic pattern */
    ρ_r=(p, r) /* the augmented pattern */
    u=π(Pρ_r[A], Pρ_r[B], Pρ_r[C], Pρ_r[D])
    /*u ∈ {A,B,C,D} is the predicted label*/
    x=θ^−1(u, h) /*x is the predicted pixel value */
    X=Behead(TrendList)
    if X==SUCCESS
      I(i, j)=x
    else
      if X is an ANOMALY-n symbol
        I(i, j)=Behead(AnomalyList)
      else
        use ρ and X to compute u', the label that
        would correctly predict I(i, j)
```

-continued

```
        I(i, j)=θ⁻¹(u', h)
    /* update prediction probabilities for ρ_r */
    u=θ(I(i, j), h)
    if u' ≠ 0
        Pρ_r[u']++
    /* update neighborhoods and runs */
    if j==W - 1
        W-nbr=-1, W-run=0 /* reset W-neighbor */
    else
        Run-Update(W-nbr, W-run, I(i, j))
        Run-Update(NW-nbr [j-i], NW-run [j-i], I(i, j))
    Run-Update(N-nbr [j], N-run [j], I(i, j))
    Run-Update(NE-nbr [j+i], NE-run [j+i], I(i, j))
end
```

Implementation

The inventor has implemented the RAPP encoder and decoder in the programming language C. For entropy-coding the list TrendList, two possibilities are used: arithmetic coding and huffman coding. The current augmented pattern when a particular symbol is added to or extracted from TrendList is useful context information to obtain better coding efficiency from the entropy-coder. While this information can always be reproduced from TrendList itself, in any practical implementation it is easier to include the entropy-coding/decoding of TrenddList into the procedures RAPP-Transform and RAPP-InverseTransform themselves. For the arithmetic-coding encoder (referred to as "enRAPPa"), 23 different contexts are used (one for each basic pattern). Depending on the number of distinct colors in a basic pattern, the number of possibilities for the output symbol in the corresponding coding context can be 2, 3, 4 or 5. For example, if the basic pattern is AAA (one distinct color only) then only the symbols SUCCESS and ANOMALY-0 are possible. If the basic pattern is AABC (three distinct colors), the symbols SUCCESS, OTHER-2-1, OTHER-2-2 and ANOMALY-2 are possible.

For the Huffman-coding encoder (referred to as "enRAPPh"), the runs of SUCCESS symbols are counted and a Huffman code used for these run values. The Huffman code table has 256 entries, one for each value of the run in the range [0, 255]. For coding a run value greater than or equal to 255, the Huffman code for 255 is repeatedly produced and the run value is decremented by 255, until it falls below 255. The Huffman code for this remainder (<255 ) is then produced. The codes were constructed using symbol probabilities gathered over some training images. The symbols in Table 2 are coded using the number of distinct labels in the basic pattern as the context, with the codes listed in Table 3. These codes were designed such that for a given context, the code for each possible symbol in that context has a unique prefix.

TABLE 3

Codes for the special symbols in TrendList for enRAPPh

| Symbol | Code |
| --- | --- |
| ANOMALY-0 | (no bits are used) |
| OTHER-1-1 | 0 |
| ANOMALY-1 | 1 |
| OTHER-2-1 | 0 |
| OTHER-2-2 | 10 |
| ANOMALY-2 | 11 |
| OTHER-3-1 | 00 |
| OTHER-3-2 | 01 |
| OTHER-3-3 | 10 |
| ANOMALY-3 | 11 |

The list of anomalous pixels, AnomalyList, is entropy-coded using the "deflate" compression algorithm in both "enRAPPa" and "enRAPPh", without using any contexts. The deflate algorithm is a variation of the LZ77 algorithm set forth in Ziv, J. and Lempel, A., A universal Algorithm for Sequential Data Compression, IEEE *Transactions on information Theory*, 23(3): 337–343, 1977.

Results

The results for three classes of images are presented. The first one is a set of street maps of Japan. These maps consist of several uniform regions together with a lot of overlaid text (in Japanese), lines and symbols. The second st t is a set of Microbiology images (from University of Connecticut). These images consist of a white background with overlaid text, chemical symbols and diagrams. The third set is a collection of clip art from Microsoft®.

For each image, the compression rate is presented (in bits per pixel) for GIF, PNG (non-predictive), JPEG-LS, CALIC (with arithmetic coding), (enRAPPh, and enRAPPa. (Without any compression, each pixel in a palettized image with palette size C would need to be represented with $[\log_2 C]$ bits plus the additional overhead for storing the palette.) To get the JPEG-LS and CALIC numbers (labeled "JLS" and "CLC"), the palettized images were presented to the encoders as grayscale images, and the size of the palette was added to the compressed size. JPEG-LS and CALIC were also applied after reordering the palettes. These results are labeled as "JLSro" and "CLCro". The enRAPPh and enRAPPa results are respectively labeled "RPPh" and "RPPa". The column labeled "#C" lists the number of distinct colors (palette size) for each image.

TABLE 4

Compression results for 560 × 560 map images

| Image | #C | GIF | PNG | JLS | JLSro | CLC | CLCro | RPPh | RPPa |
| --- | --- | --- | --- | --- | --- | --- | --- | --- | --- |
| 2b04py- | 72 | 0.7511 | 0.5658 | 1.0615 | 0.6562 | 0.6507 | 0.4621 | 0.4175 | 0.3498 |
| 2b09ef- | 79 | 1.2325 | 0.8754 | 1.8363 | 1.1679 | 1.1914 | 0.8708 | 0.6481 | 0.5654 |
| 2b09cq- | 75 | 1.1103 | 0.8588 | 1.7203 | 1.0672 | 1.1156 | 0.8177 | 0.7023 | 0.5851 |
| 2b0avt- | 78 | 0.8748 | 0.7105 | 1.2988 | 0.7928 | 0.7967 | 0.5666 | 0.5405 | 0.4089 |
| 2b176v- | 55 | 1.0514 | 0.7748 | 1.4788 | 0.9643 | 0.8921 | 0.6130 | 0.6655 | 0.4296 |
| 2b1jhh- | 66 | 0.7946 | 0.5721 | 1.0635 | 0.7111 | 0.5909 | 0.4405 | 0.4769 | 0.3130 |

TABLE 4-continued

Compression results for 560 × 560 map images

| Image | #C | GIF | PNG | JLS | JLSro | CLC | CLCro | RPPh | RPPa |
|---|---|---|---|---|---|---|---|---|---|
| 29wijs- | 18 | 0.4633 | 0.2968 | 0.4701 | 0.4124 | 0.2796 | 0.2598 | 0.2089 | 0.1579 |
| Average | | 0.8968 | 0.6649 | 1.2756 | 0.8245 | 0.7882 | 0.5758 | 0.5228 | 0.4014 |

TABLE 5

Compression results for Microbiology images

| Image | #C | GIF | PNG | JLS | JLSro | CLC | CLCro | RPPh | RPPa |
|---|---|---|---|---|---|---|---|---|---|
| cmpmtab | 6 | 0.2374 | 0.1334 | 0.2654 | 0.1869 | 0.1005 | 0.0995 | 0.1290 | 0.0810 |
| c-cycle | 10 | 0.2476 | 0.1626 | 0.2711 | 0.1979 | 0.1384 | 0.1235 | 0.1407 | 0.0831 |
| s-cycle | 2 | 0.1875 | 0.0888 | 0.1311 | 0.1311 | 0.0705 | 0.0705 | 0.1075 | 0.0613 |
| 16rnatr | 2 | 0.0928 | 0.0517 | 0.0504 | 0.0504 | 0.0351 | 0.0351 | 0.0692 | 0.0240 |
| bg-comb | 5 | 0.2736 | 0.2216 | 0.3837 | 0.2566 | 0.1620 | 0.1601 | 0.2113 | 0.1303 |
| rdxtwr | 2 | 0.2827 | 0.1115 | 0.1662 | 0.1662 | 0.2321 | 0.2321 | 0.1539 | 0.1666 |
| orgrdx | 4 | 0.1574 | 0.0665 | 0.1359 | 0.1225 | 0.0428 | 0.0422 | 0.0759 | 0.0366 |
| Average | | 0.2113 | 0.1194 | 0.2005 | 0.1588 | 0.1116 | 0.1090 | 0.1268 | 0.0833 |

TABLE 6

Compression results for clip art

| Image | #C | GIF | PNG | JLS | JLSro | CLC | CLCro | RPPh | RPPa |
|---|---|---|---|---|---|---|---|---|---|
| 6cbirt | 170 | 1.6645 | 1.8602 | 2.0652 | 1.7962 | 2.3982 | 1.7249 | 1.3515 | 1.2147 |
| citysc | 4 | 1.1047 | 0.4847 | 0.5428 | 0.5172 | 0.3200 | 0.2493 | 0.3549 | 0.2395 |
| highwy | 12 | 1.7153 | 0.9529 | 0.9327 | 0.7603 | 0.7272 | 0.5015 | 0.6319 | 0.4379 |
| bully | 2 | 0.9122 | 0.4972 | 0.9377 | 0.5410 | 0.3602 | 0.3470 | 0.4533 | 0.3287 |
| cowboy | 7 | 1.3893 | 0.7002 | 0.6883 | 0.6012 | 0.8974 | 0.4776 | 0.5307 | 0.3937 |
| 19cchtr | 182 | 1.8365 | 1.6665 | 2.4722 | 1.9041 | 2.4773 | 1.8432 | 1.2711 | 1.1519 |
| Average | | 1.4371 | 1.0269 | 1.2732 | 1.0200 | 1.1967 | 0.8573 | 0.7656 | 0.6277 |

The results show that RAPP with arithmetic coding consistently outperforms all other techniques. The Huffman-coding variant of RAPP, enRAPPh currently uses a fixed set of Huffman tables (created using statistics from one of the map images). On images where the statistics are considerably different, enRAPPh does not perform very well. One possibility for alleviating this is to use custom Huffman tables for each image (which requires two passes), while the other is to use some form of adaptive Huffman coding (such as that used in JPEG-LS).

In general, the entropy coding part of RAPP can use any method, depending upon the application and the acceptable complexity level. Simpler codecs can be implemented by using simpler entropy coding schemes (for example, by using Huffman or arithmetic coding for both AnomalyList and TrendList). Also, RAPP can simply be used to replace run-length coding in any codec. Instead of using the W-neighbor as the predictor, the new codec will use adaptive pixel patterns; the entropy-coding part of the codec need not be changed at all.

Figure 5:
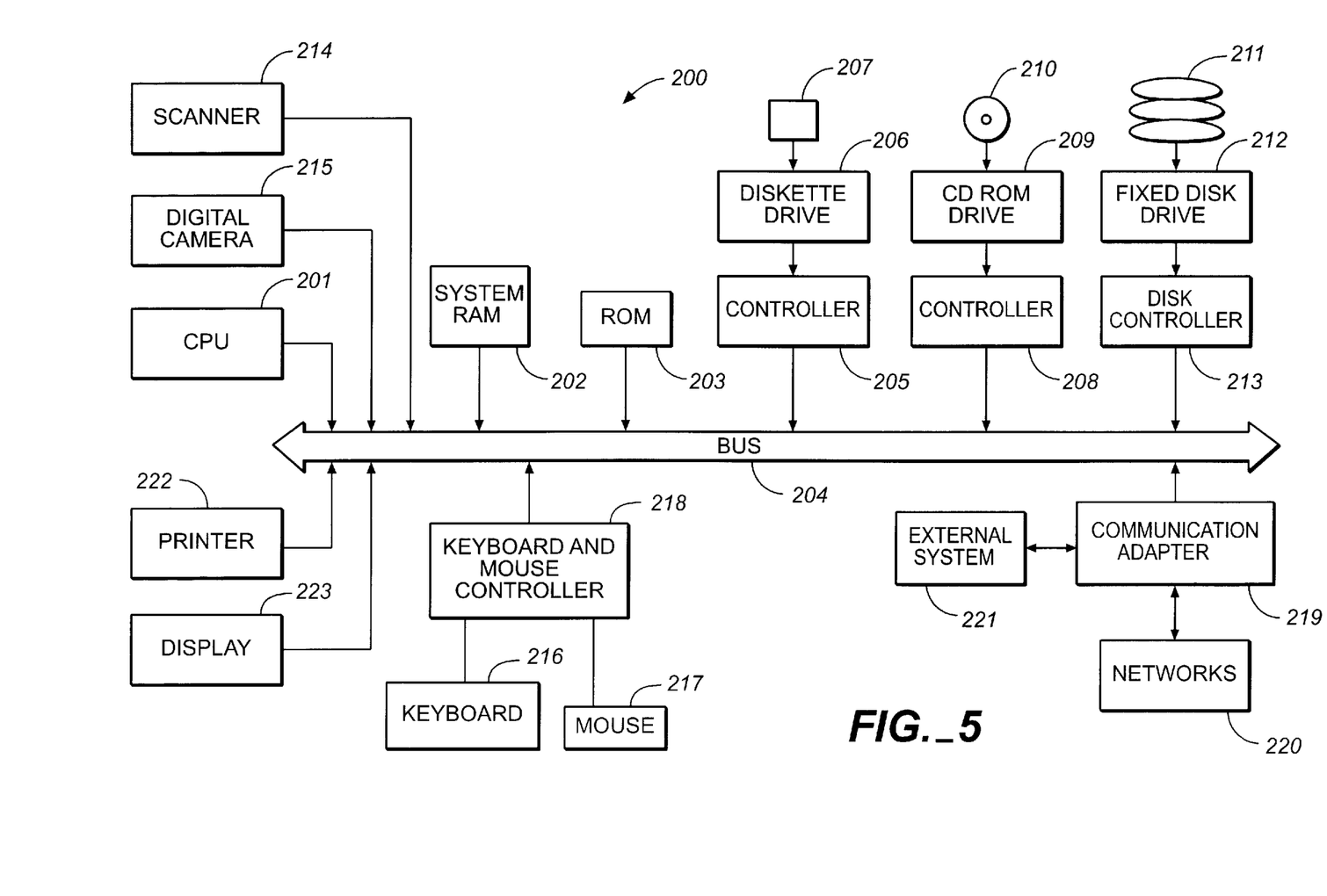
FIG. 5 is a block diagram of a computer system suitable for use with the present invention.

FIG. 5 is a block diagram of a computer system incorporating the encoder 22 and decoder 26 of the present invention. The computer system, which is identified generally by reference numeral 200, may be of any suitable type and represents an environment in which the invention may be practiced. By way of example, computer system 200 may be a main frame or personal computer, the latter of which may be of the IBM® compatible or Macintosh® type. Although the description may refer to terms commonly used in connection with particular computer systems, the description and concepts equally apply to other systems, including systems having different architectures from that shown in FIG. 5.

Computer system 200 comprises a central processing unit (CPIJ) 201 which may be a conventional microprocessor, a random access memory (RAM) 202 for temporary storage of information, and a read only memory (ROM) 203 for permanent storage of information. Each of these components is coupled to a bus 204. Operation of the computer system 200 is typically controlled and coordinated by operating system software. The operating system, which is embodied in the system memory and runs on CPU 201, coordinates the operation of the other components of computer system 200 by controlling allocation of system resources and performing a variety of tasks, such as processing, memory management, networking and I/O functions, among others.

Also coupled to bus 204 by a controller 205 is a diskette drive 206 into which a non-volatile mass storage device such as a diskette 207 may be inserted. Similarly, a controller 208 interfaces between bus 204 and a compact disc (CD) ROM drive 209 which is adapted to receive a CD ROM 210. A hard disk 211 is provided as part of a fixed disk drive 212 which is coupled to bus 204 by a disk controller 213.

Software for the RAPP image compression and decompression techniques described herein may be stored on storage devices 207 and 210 and transferred to CPU 201 for execution. Alternatively, the software may be stored in RAM 202 or ROM 203. Similarly, image data generated in accordance with the invention may be loaded into and extracted from computer system 200 using removable storage media devices such as the diskette 207 and CD ROM 210. Alternatively, such data could be simply be stored by CPU 201 or in ROM 203.

Image data may also be input into computer system 200 by way of a variety of image sources, which are coupled to bus 204. Such image sources may include, for example, scanner 214 and digital camera 215. A keyboard 216 and mouse 217, which are coupled to bus 204 via a controller 218, facilitate the input of such data and otherwise provide a means for entering information into computer system 200.

Image data and computer software may also be transferred to and from computer system 200 for remote locations. To this end, computer system 200 may also include a communications adapter 219 which enables the system 200 to communicate with networks 220, which may include local area networks (LANs), the internet or online services, via direct connections or via modem. Communications adapter 219 may also be used to enable the system 200 to communicate with an external system 221 such as a global positioning system (GPS) via an appropriate transmission link.

In operation, the CPU 201 of computer system 200 may, for example, decompress compressed image data received from storage device 207 or 210 or from a network 220 or external system 221 for printing on printer 222 or viewing on display 223. Conversely, CPU 201 may compress uncompressed image data received from any of the aforementioned sources for transmission and/or storage.

While the invention has been described in conjunction with specific embodiments, it will be evident to those skilled in the art in light of the foregoing description that many further alternatives, modifications and variations are possible. For example, the image compression technique of the present invention, although specifically designed for palettized synthetic images, may be used for other types of images as well. Also, different previously-coded neighboring pixels may be used depending on how the image is scanned. Accordingly, the invention described herein is intended to embrace all such alternatives, modifications, applications and variations as may fall within the spirit and scope of the appended claims.

What is claimed is:

1. A method of coding a pixel in a digitized image, comprising the steps of:

determining an augmented pattern of said pixel based on a plurality of previously-coded neighboring pixels, each having a value, wherein the augmented pattern comprises a basic pattern which assigns a label to each previously-coded neighboring pixel, and a character for each previously-coded neighboring pixel that represents the number of times the value of that previously-coded neighboring pixel is repeated in a particular direction;

determining a probability for each label of the basic pattern;

predicting a label of said pixel based on a comparison of the determined probability for each label;

determining the actual label of said pixel; and coding said pixel based on the predicted label and the determined actual label of said pixel.

2. The method as recited in claim 1, wherein the labels of the basic pattern identify which of the previously-coded neighboring pixels are identical.

3. The method as recited in claim 1, further comprising the step of:

producing one of a plurality of symbols to indicate that one of a plurality of conditions has been satisfied.

4. The method as recited in claim 3, wherein said producing stop comprises producing a first symbol, if the predicted label is the same as the determined actual label.

5. The method as recited in claim 4, wherein said producing step comprises producing a second symbol indicating which of the previously-coded neighboring pixels has the same value as said pixel, if the predicted label is not the same as the determined actual label and if at least one of the previously-coded neighboring pixels is determined to have the same value as said pixel.

6. The method as recited in claim 5, wherein said producing step comprises producing a third symbol indicating prediction failure, if the predicted label is not the same as the determined actual label and if the value of said pixel is determined not to be the same as the value of any of the previously-coded neighboring pixels.

7. The method as recited in claim 1, further comprising the steps of:

producing a first symbol, if the predicted label is the same as the determined actual label.

determining whether a value of said pixel is the same as the value of at least one of the previously-coded neighboring pixels, if the predicted label is not the same as the determined actual label;

producing a second symbol indicating which of the previously-coded neighboring pixels has the same value as said pixel, if the predicted label is not the same as the determined actual label and if the value of said pixel is determined to be the same as the value of at least one of the previously-coded neighboring pixels; and producing a third symbol indicating prediction failure, if the predicted label is not the same as the determined actual label and if the value of said pixel is determined not to be the same as the value of at least one of the previously-coded neighboring pixels.

8. The method as recited in claim 1, wherein the plurality of previously-coded neighboring pixels comprise at least a first pixel located to the west of said pixel and a second pixel located to the northwest of said pixel.

9. The method as recited in claim 8, wherein the plurality of previously-coded neighboring pixels further comprise a third pixel located to the north of said pixel and a fourth pixel located to the northeast of said pixel.

10. The method as recited in claim 7, wherein a plurality of pixels in the digitized image are coded to compress the digitized image, and wherein said coding step comprises entropy-coding the produced symbols to obtain the compressed image.

11. The method as recited in claim 10, wherein said produced symbols are entropy-coded using arithmetic coding.

12. The method as recited in claim 10, wherein said produced symbols are entropy-coded using Huffman coding.

13. The method as recited in claim 10, further comprising the step of:

updating the probability for the label that would have correctly predicted said pixel in the augmented pattern.

14. An encoder for coding a plurality of pixels in a digitized image, comprising:

means for applying a transform to the digitized image to determine an augmented pattern of each pixel based on a plurality of previously-coded neighboring pixels, each having a value, wherein the augmented pattern comprises a basic pattern which assigns a label to each previously-coded neighboring pixel, and a character for each previously-coded neighboring pixel that represents the number of times the value of that previously-coded neighboring pixel is repeated in a particular direction;

wherein said transform applying means determines, for each augmented pattern, a probability for each label of the basic pattern, predicts a label of each pixel based on a comparison of the determined probability for each label and determines the actual label of each pixel; and means for coding each pixel based on the predicted label and the determined actual label of that pixel.

15. The encoder as recited in claim 14, wherein said transform applying means determines an augmented pattern of each pixel based on a plurality of previously-coded neighboring pixels comprising first, second, third and fourth pixels, the augmented pattern comprising a basic pattern that includes first, second, third and fourth labels, one for each of said first, second, third and fourth previously-coded neighboring pixels respectively, and a first character indicative of the number of times the value of said first pixel is repeated in a first direction, a second character indicative of the number of times the value of said second pixel is repeated in a second direction, a third character indicative of the number of times the value of said third pixel is repeated in a third direction and a fourth character indicative of the number of times the value of said fourth pixel is repeated in a fourth direction.

16. The encoder as recited in claim 14, wherein said transform applying means determines, for each augmented pattern, a probability for each label of the basic pattern based on a number of times that label would have been a successful predictor for that augmented pattern at any point in the coding of the plurality of pixels.

17. The encoder as recited in claim 14, wherein, for each augmented pattern, said transform applying means updates the probability for the label that would have correctly predicted the pixel associated with that augmented pattern.

18. The encoder as recited in claim 14, further comprising:

means for producing one of a plurality of symbols for each augmented pattern to indicate that one of a plurality of conditions has been satisfied.

19. The encoder as recited in claim 18, wherein said plurality of conditions comprise a first condition which is satisfied if the predicted label is the same as the determined actual label of the pixel associated with that augmented pattern, a second condition which is satisfied if the predicted label is not the same as the determined actual label of the pixel associated with that augmented pattern and the value of the associated pixel is the same as the value of at least one of the previously-coded pixels for that augmented pattern, and a third condition which is satisfied if the predicted label is not the same as the determined actual label of the pixel associated with that augmented pattern and the value of the associated pixel is not the same as the value of at least one of the previously-coded pixels for that augmented pattern.

20. The encoder as recited in claim 18, wherein said coding means codes one of a plurality of symbols produced for each augmented pattern using arithmetic coding.

21. The encoder as recited in claim 18, wherein said coding means codes one of a plurality of symbols produced for each augmented pattern using Huffman coding.

22. An encoder/decoder system, comprising:

an encoder for coding a plurality of pixels in the digitized image, comprising:

means for applying a transform to the digitized image to determine an augmented pattern of each pixel based on a plurality of previously-coded neighboring pixels, each having a value, wherein the augmented pattern comprises a basic pattern which assigns a label to each previously-coded neighboring pixel, and a character for each previously-coded neighboring pixel that represents the number of times the value of that previously-coded neighboring pixel is repeated in a particular direction, wherein said transform applying means determines, for each augmented pattern, a probability for each label of the basic pattern, predicts a label of each pixel based on a comparison of the determined probability for each label and determines the actual label of each pixel, wherein said transform applying means generates one of a plurality of symbols for each augmented pattern to indicate that one of a plurality of conditions has been satisfied; and a code generator for coding each of the produced plurality of symbols to compress the image; and a decoder for decoding the coded plurality of symbols, comprising:

a symbol recovery generator for decoding the coded symbols; and means for applying an inverse transform to recover the digitized image.

23. The encoder/decoder system as recited in claim 22, wherein said code generator codes each of the produced plurality of symbols using arithmetic coding.

24. The encoder/decoder system as recited in claim 22, wherein said code generator codes each of the produced plurality of symbols using Huffman coding.

25. A decoder for decoding a plurality of coded symbols to obtain an uncompressed digitized image represented by a plurality of pixels, each having a value, comprising:

a symbol recovery generator for decoding the plurality of coded symbols to recover the decoded symbols;

means for applying an inverse transform to the decoded symbols to determine the value of each of the plurality of pixels by extracting an augmented pattern of each pixel based on a plurality of neighboring pixels, wherein the augmented pattern comprises a basic pattern which includes a label for each of the neighboring pixels, and a character for each of the plurality of neighboring pixels that represents the number of times the value of that neighboring pixel is repeated in a particular direction, wherein said inverse transform applying means determines a value for each pixel based on the augment pattern of that pixel.

26. A computer system including a processor and a memory having a computer-readable program code embodied therein for causing the processor to code a plurality of pixels in a digitized image;

wherein said processor applies a transform to the digitized image to determine an augmented pattern of each pixel based on a plurality of previously-coded neighboring pixels, each having a value, wherein the augmented pattern comprises a basic pattern which assigns a label to each previously-coded neighboring pixel, and a character for each previously-coded neighboring pixel that represents the number of times the value of that previously-coded neighboring pixel is repeated in a particular direction;

wherein said processor determines, for each augmented pattern, a probability for each label of the basic pattern, predicts a label of each pixel based on a comparison of the determined probability for each label and determines the actual label of each pixel; and wherein said processor codes each pixel based on the predicted label and the determined actual label of that pixel.

27. A computer-usable medium having a computer-readable program code embodied therein for causing a computer to code a pixel in a digitized image by performing the steps of:

determining an augmented pattern of said pixel based on a plurality of previously-coded neighboring pixels, each having a value, wherein the augmented pattern comprises a basic pattern which assigns a label to each previously-coded neighboring pixel, the labels identifying which of the previously-coded neighboring pixels are identical, said augmented pattern further comprising a plurality of characters, one for each previously-coded neighboring pixel that represents the number of times the value of that previously-coded neighboring pixel is repeated in a particular direction;

determining a probability for each label of the basic pattern;

predicting a label of said pixel based on a comparison of the determined probability for each label;

determining the actual label of said pixel;

producing one of a plurality of symbols to indicate that one of a plurality of conditions has been satisfied; and entropy-coding the produced symbol.

28. The computer usable medium as recited in claim 27, wherein said plurality of previously-coded neighboring pixels comprise a first pixel located to the west of said pixel, a second pixel located to the northwest of said pixel, a third pixel located to the north of said pixel and a fourth pixel located to the northeast of said pixel.

29. The computer usable medium as recited in claim 28, wherein said plurality of characters comprises a first character that represents the number of times the value of said first pixel is repeated in the west direction, a second character that represents the number of times the value of said second pixel is repeated in the northwest direction, a third character that represents the number of times the value of said third pixel is repeated in the north direction and a fourth character that represents the number of times the value of said fourth pixel is repeated in the northeast direction.

30. The computer usable medium as recited in claim 27, wherein a first symbol is produced, if the predicted label is the same as the determined actual label, wherein a second symbol is produced if the predicted label is not the same as the determined actual label and if a value of said pixel is determined to be the same as the value of at least one of the previously-coded neighboring pixels, said produced second symbol indicating which of the previously-coded neighboring pixels has the same value as said pixel; and wherein a third symbol is produced indicating prediction failure, if the predicted label is not the same as the determined actual label and if a value of said pixel is determined not to be the same as the value of at least one of the previously-coded neighboring pixels.

* * * * *

UNITED STATES PATENT AND TRADEMARK OFFICE
CERTIFICATE OF CORRECTION

PATENT NO. : 6,038,346
DATED : March 14, 2000
INVENTOR(S) : Viresh Ratnakar

It is certified that error appears in the above-identified patent and that said Letters Patent is hereby corrected as shown below:

Title page, Item [73],
Assignee: Change "Seiko Espoo" to -- Seiko Epson --.

Column 16,
Line 6, change "stop" to -- step --.

Signed and Sealed this

Eighteenth Day of September, 2001

*Attest:*

NICHOLAS P. GODICI
*Attesting Officer  Acting Director of the United States Patent and Trademark Office*